(No Model.)
H. FRIEDMAN.
Kettle.
No. 238,883. Patented March 15, 1881.
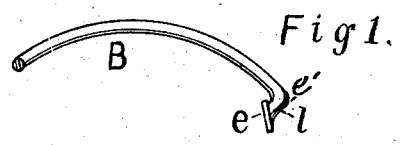
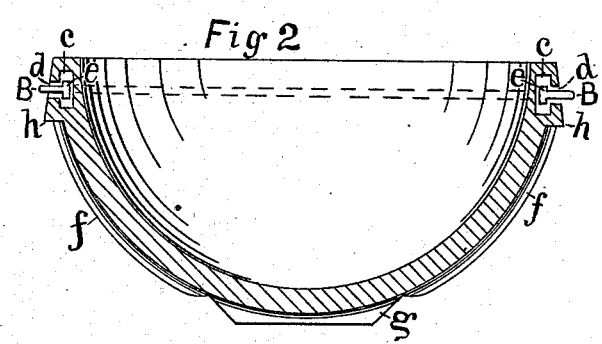
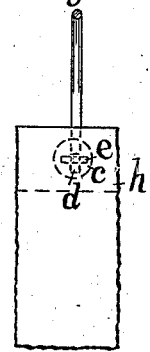
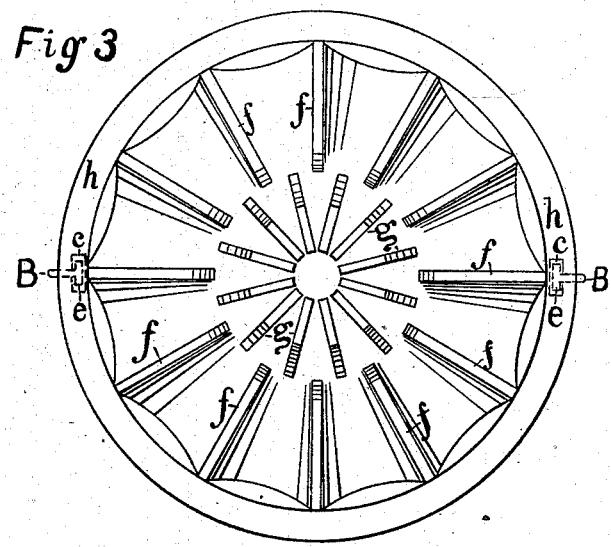
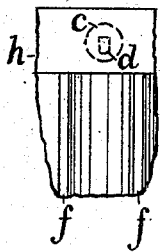
Witnesses.
Chas H. Wood.
Wm Zimmerman
Inventor.
Henry Friedman.
By Gridley & Co
Attys

UNITED STATES PATENT OFFICE.

HENRY FRIEDMAN, OF CHICAGO, ILLINOIS.

KETTLE.

SPECIFICATION forming part of Letters Patent No. 238,883, dated March 15, 1881.

Application filed November 17, 1880. (No model.)

*To all whom it may concern:*

Be it known that I, HENRY FRIEDMAN, of Chicago, in the county of Cook and State of Illinois, have invented certain new and useful Improvements in Earthenware Kettles; and I do hereby declare the following to be a full, clear, and exact description thereof, which will enable others skilled in the art to which my invention appertains to make and use the same, reference being had to the accompanying drawings, forming a part hereof, and in which—

Figure 1 represents a perspective view of one end of the bail, as constructed for my improved kettle. Fig. 2 represents a central sectional elevation. Fig 3 represents a plan view of the bottom of my improved kettle. Fig. 4 represents a section of the kettle and bail as seen from its inner side, showing chamber and the end of the bail therein. Fig. 5 represents an exterior view of a section, showing the chamber and the opening thereto, and also the flutings of the fan below its rim.

Like letters of reference indicate like parts.

My invention relates to that class of kettles constructed of earthenware; and it consists in the construction and combination of the several parts, as hereinafter more particularly described and claimed.

Earthenware pots or kettles, when constructed of suitable material and uniform thickness, may be made to endure heat sufficient for cooking purposes when placed on top of a stove, if not in direct contact with it except at points, as when placed on legs; but if such vessel is hung into the pot-hole of a stove it will break, owing to the fact that the part below the top of the stove receives a much greater degree of heat, which will cause it to expand more than the part above the top of the stove, and it will be more apt to crack on the line of contact of the stove-top with the pot or kettle than at any other place. I obviate this difficulty by forming the exterior of the vessel into flutings, so that the vessel, when hung into the pot-hole of a stove or placed upon its top, shall touch the stove only on the edges of the flutings, thereby preventing the vessel from being suddenly heated to a high degree upon its line of contact when hung into the stove, and allow the heat to pass upward through the furrows of the flutings, and thus heat it more uniformly.

A vessel constructed and used as described will boil water in one-fourth the time that it can be done when constructed and used as described in Letters Patent No. 225,492, which can only be set on top of a stove without breaking by the heat when held away from it by its short legs.

An earthenware pot or kettle that could successfully withstand the heat when placed in the pot-hole of a stove has long been desired by the trade, and such I am enabled to furnish by constructing the kettle with flutings or corrugations, as shown and described.

In the drawings, A represents an earthenware kettle the interior of which is formed of a smooth and perfectly hemispherical surface, the upper edge of which is provided with a rim, $h$, and below which the exterior surface is fluted, as shown by the ribs $f$, more or less concave, as shown at $i$. The center of the bottom part may, if desired, be divided or arranged into a separate design, as shown at $g$, also fluted, and a part of which flutings are raised or projected farther outward than the normal heights of the flutings, so as to form a straight or flat part and cause the vessel to stand more securely. By thus constructing flutings which form a part of the vessel, upon which the vessel rests on their edges, either when set on the top of a stove or hung within the opening or pot-hole, the heat does not act so violently upon any one part of it as to cause it to crack, as the air can always pass through under it when placed on the stove, and the flutings on the side protect it from the great heat of the stove-top, and at the same time allow the heat to pass more freely up on its sides in a more uniform manner, and so cause the temperature to change more gradually and uniformly over its whole surface.

Diametrically opposite each other, in the rim $h$, are constructed chambers $c$, provided with oblong vertical openings $d$, made in the chambers $c$ from the outside, for the purpose of receiving the ends of the bail B. The bail B is made of stout wire, the end $e'$ of which is bent inward at right angles to the main part, and the outer portion thereof, and flattened so as to form a bar, e, the plane of which lies at right angles to that of the plane of the bail, and so as to leave a round part, l. The bail is sprung, so that the ends, when free, will be closer together than when on the vessel, so as to give the bail a slight spring pressure inward on its ends.

When it is desired to unite the bail to the kettle it is held in a plane parallel, or nearly so, with the top thereof, as seen in dotted outline in Fig. 2, and the ends are sprung into their respective places and let go. The lower edge of the ends e' will then fall below the opening d, from which they cannot be removed unless first raised so as to be opposite the hole d.

When the bale is raised at its center, just sufficient to cross the ends e' beyond the openings d, it cannot be removed from the pan, and when it is vertical the bar e stands at right-angles to the slot d, and moves freely in the chamber c.

I employ special tools for constructing the chamber c with its opening d; but a core may be employed, as in casting.

A vessel so constructed becomes self-righting when upset, and may, for this object more expressly, have its bottom made heavier.

I am aware that bails have been attached to pots and pails in such a manner that the hoop or other plate to form the bearing in which the bail works also forms the cover to the pocket or chamber in which the end of the bail works, and from which it cannot readily be removed; but I am not aware that a chamber for the end of a bail, formed wholly within the walls of a pot or kettle, and arranged to receive the ends of a bail, and to which the bail could be attached and removed at pleasure, as shown, has ever been made.

Having thus described my invention, what I claim as new, and desire to secure by Letters Patent, is—

1. An earthenware pot or kettle provided with the flutings or corrugations f and g upon its exterior surface, and forming a part thereof, substantially as and for the purpose specified.

2. An earthenware pot or kettle provided with the chambers c, having exterior slots or openings d extending thereinto, in combination with a bail, B, having flattened ends e', substantially as and for the purpose specified.

3. An earthenware vessel, A, provided with the flutings f g upon its exterior surface, and chambers c, having slotted openings d, in combination with a bail, B, substantially as shown and described.

HENRY FRIEDMAN.

Witnesses:
WM. ZIMMERMAN,
M. A. THRONE.